(12) United States Patent
Cupo et al.

(10) Patent No.: US 6,377,566 B1
(45) Date of Patent: Apr. 23, 2002

(54) OFDM SUBCARRIER HOPPING IN A MULTI SERVICE OFDM SYSTEM

(75) Inventors: Robert Louis Cupo, Eatontown; Mohsen Sarraf, Rumson; Mojtaba Shariat, Matawan; Mohammad Hossein Zarrabizadeh, Woodbridge, all of NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/049,985

(22) Filed: Mar. 30, 1998

(51) Int. Cl.[7] .................................................. H04J 1/02
(52) U.S. Cl. ...................................... 370/343; 370/487
(58) Field of Search ................................ 370/203, 208, 370/276, 277, 281, 310, 319, 329, 330, 343, 344, 480, 481, 482, 485, 486, 487, 489, 499, 493, 494, 495, 496; 375/132, 133, 135, 136, 302, 334, 335; 455/59, 62

(56) References Cited

U.S. PATENT DOCUMENTS

| | | | |
|---|---|---|---|
| 4,355,399 A | * 10/1982 | Timor | 375/202 |
| 5,282,222 A | 1/1994 | Fattouche et al. | |
| 5,283,780 A | * 2/1994 | Schuchman et al. | 370/312 |
| 5,465,396 A | 11/1995 | Hunsinger et al. | |
| 5,483,690 A | 1/1996 | Schroder | |
| 5,521,943 A | 5/1996 | Dambacher | |
| 5,584,051 A | 12/1996 | Goken | |
| 5,610,908 A | 3/1997 | Shelswell et al. | |
| 5,790,550 A | * 8/1998 | Peeters et al. | 370/480 |
| 5,912,917 A | * 6/1999 | Engelbrecht et al. | 375/37 |
| 5,970,085 A | * 10/1999 | Yi | 375/200 |
| 6,128,334 A | * 10/2000 | Dapper et al. | 375/216 |

* cited by examiner

Primary Examiner—Kwang B. Yao
(74) Attorney, Agent, or Firm—William H. Bollman

(57) ABSTRACT

An OFDM subcarrier method and apparatus effectively reassigns subcarriers with respect to a data stream from a plurality of Digital Audio Broadcast (DAB) services or programs to reduce selective effects (e.g., selective channel fading) of the transmission channel (e.g., an FM station) on some of the DAB services or programs but not on others. In one embodiment, a symbol reassignment encoder at the transmitter shuffles the data or symbols in the data stream from the DAB services to effectively reassign the subcarriers used by each of the DAB services. The reassignment spreads the selective effects of the transmission channel, e.g., channel fading, over a larger group of DAB services, to improve the robustness and quality of the overall transmission channel.

24 Claims, 5 Drawing Sheets

OFDM SUBCARRIER HOPPING IN A MULTI SERVICE OFDM SYSTEM

BACKGROUND OF THE INVENTION

1. Field of the Invention

This invention relates to any system using a robust OFDM transmission scheme which is capable of reliably carrying a plurality of services or programs (referred to collectively herein as services) within each channel of allocated bandwidth even in a selective channel fading environment.

2. Background of Related Art

A transmission channel used by an In-Band On-Channel (IBOC) FM Digital Audio Broadcast (IBOC FM-DAB) system allows simultaneous transmission of Digital Audio Broadcast (DAB) information and Frequency Modulation (FM) over existing FM frequency channels without interfering with conventional analog FM signals.

For instance, within each transmission channel (e.g., each FM station) having an allotted station bandwidth of, e.g., 200 kHz, a number of different DAB services or programs (e.g., three different DAB services or program information bit streams from three different sources) can be transmitted simultaneously using Orthogonal Frequency Division Multiplexing (OFDM) modulation. OFDM has several desirable properties, e.g., it simplifies or even eliminates equalization problems considerably, has graceful performance degradation, and because of the absence of equalization, can be lower in complexity.

In OFDM, different bits are placed in each of the available OFDM subcarriers 1 to N, e.g., bits 1 to 4 of a data sample in one OFDM subcarrier, bits 5 to 8 of the data sample in another OFDM subcarrier, etc., for all of M bits in N OFDM subcarriers. Note that this is similar to a frame, but in the frequency domain, not in the time domain.

FIG. 4 shows a block diagram of a conventional OFDM transmission system.

In particular, in the transmitting portion 420 of the OFDM transmission system shown in FIG. 4, a data source containing source bits from all the different DAB services or programs (e.g., three different DAB services or programs) is input to a bits to symbol mapper 402. The bits to symbol mapper 402 maps the data bits for current frames output from respective DAB services or programs into a contiguous symbol stream. The contiguous symbol stream is input to an OFDM transmitter and radio frequency (RF) transmitter front end 404, which transmits the contiguous symbol stream at various available OFDM subcarrier frequencies.

At the receiving portion 430 of the OFDM transmission system shown in FIG. 4, an RF receiver front end and OFDM receiver 406 receives the contiguous symbol stream containing the information for the number of different DAB services or programs (e.g., for three different DAB services or programs). A symbols to bits demapper 408 converts the contiguous symbol stream back into a data bit stream containing data for the current frames of all the different DAB services or programs.

FIG. 5 shows a conventional distribution of OFDM subcarriers 1 to N for use by the different DAB services or programs, e.g., three different DAB services or programs 502–506. The OFDM subcarriers 1 to N are used in the transmission between the transmitting portion 420 and receiving portion 430 of a conventional OFDM transmission system.

When a number of different DAB services or programs 502–506, e.g., three, are simultaneously transmitted, the available OFDM subcarriers 1 to N are conventionally distributed or assigned contiguously between the three different DAB services or programs 502–506. The number of subcarriers assigned to each DAB service or program is application specific, and typically depends upon the information capacity required by each DAB service or program.

In conventional OFDM transmission systems, each of the different DAB services or programs are typically assigned a fixed, contiguous subset of the total number of available OFDM subcarriers 1 to N. Thus, a first DAB service or program is typically assigned the first $N_1$ of all available OFDM subcarriers (e.g., 1 to $N_1$), a second DAB service is typically assigned the next $N_2$ of the remaining available OFDM subcarriers (e.g., $N_1+1$ to $N_2$), etc.

For instance, as shown in FIG. 5, a first DAB service 502 includes contiguous OFDM subcarriers 1 to $N_1$, a second DAB service 504 includes contiguous OFDM subcarriers $N_1+1$ to $N_1+N_2$, and a third DAB service 506 includes contiguous OFDM subcarriers $N_1+N_2+1$ to N. Thus, of an available group of OFDM subcarriers 1 to N and three DAB services or programs, OFDM subcarriers 1 to $N_1$ are conventionally assigned for use by the first DAB service 502, OFDM subcarriers $N_1+1$ to $N_1+N_2$ are conventionally assigned for use by the second DAB service 504, and contiguous OFDM subcarriers $N_1+N_2+1$ to $N_1+N_2+N_3$ (i.e., N) are conventionally assigned for use by the third DAB service 506.

However, a transmission channel 540 (e.g., an FM station) containing the OFDM subcarriers 1 to N of the different DAB services or programs 502–506 may be subject to slow selective fading affecting some of the DAB services or programs but not others, particularly in a fixed or slow speed mobile environment. For instance, one DAB service or program may be detrimentally affected at the same time that a second DAB service or program may be unaffected.

Each of the different DAB services or programs 502–506 conventionally may have its own interleaver and/or Forward Error Correction (FEC) scheme to improve the quality of the transmission channel 540. Thus, particularly with the implementation of such error correction schemes, it is recognized by the present inventors that unaffected DAB services or programs in light of selective channel fading may have excess margin to more than compensate for the channel fading for that respective DAB service or provider. In this case, while the interleaver and/or FEC function of the second DAB service or program may be suitable to maintain reliable communications in the transmission channel 540, e.g., an FM station, the interleaver and FEC function of the first DAB service or program may not be adequate to fully overcome the deterioration of the data communication due, e.g., to the channel fades. Thus, the impact of channel fades may not be fully or evenly mitigated by all or substantially all DAB services or programs within any one transmission channel.

One of the DAB services or programs may be hit by the fade much more severely than another. For instance, a portion or all of one DAB service or program may be affected whereas at the same time another DAB service or program may be marginally affected or not affected at all. In such an environment, the OFDM transmission scheme in the transmission channel 540 may be adequate for one DAB service or program yet at the same time be inadequate for another.

There is thus a need to improve the reliability of all or substantially all DAB services or programs transmitted within a transmission channel, e.g., within an FM channel, using OFDM modulation.

SUMMARY OF THE INVENTION

In accordance with the principles of the present invention, a transmitter for an OFDM transmission system comprises a data reassignment encoder and an OFDM transmitter. The data reassignment encoder shuffles an input data stream corresponding to a plurality of services into a shuffled output data stream, the shuffled data in the output data stream being shuffled to effectively reassign each of the services with respect to an arrangement of corresponding data in the input data stream. The OFDM transmitter transmits the output data stream at a plurality of subcarriers.

A receiver is also provided. The OFDM receiver is adapted to receive a shuffled data stream corresponding to a plurality of services. A data reassignment decoder un-shuffles the shuffled data stream into an unshuffled data stream to effectively re-align the data stream with respect to the services.

A method of transmitting a data stream corresponding to a plurality of services using OFDM is also provided in accordance with the present invention. The method comprises shuffling an input data stream corresponding to the DAB services into an output data stream containing shuffled data with respect to corresponding data in the input data stream. The shuffled data stream is transmitted over a plurality of subcarriers using OFDM. The shuffling of the input data stream effectively reassigns each of the subcarriers with respect to the services.

A method of receiving a shuffled data stream corresponding to a plurality of services using OFDM is also provided. This method comprises receiving a shuffled input data stream transmitted over a plurality of subcarriers using OFDM. The input data stream is un-shuffled, and an output data stream is provided with respect to a plurality of services. The un-shuffling is based on a control signal received with the shuffled input data stream, and effectively re-aligns a data stream with respect to the plurality of services.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1A:
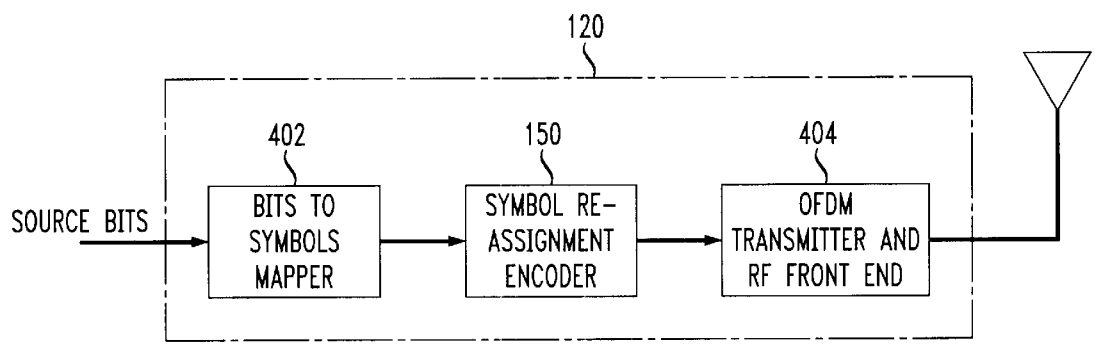
FIGS. 1A and 1B show a high level block diagram of an embodiment of an OFDM transmission system in accordance with the principles of the present invention.
Figure 1B:
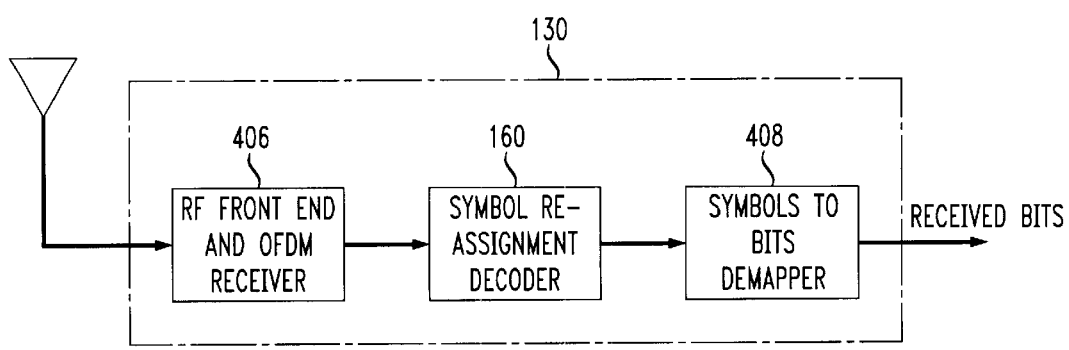

FIGS. 1A and 1B show a high level block diagram of an OFDM transmission system in accordance with the principles of the present invention. FIG. 1A shows the transmitting portion 120, and FIG. 1B shows the receiving portion 130, of an OFDM transmission system in accordance with the principles of the present invention.

In FIG. 1A, a data source containing data bits from all the different DAB services or programs (e.g., three different DAB services or programs) is input to a bits to symbol mapper 402. In accordance with the principles of the present invention, a symbol reassignment encoder 150 is placed between the bits to symbols mapper 402 and the OFDM transmitter and RF transmitter front end 404 to shuffle the contiguously assigned symbols so as to effect a reassignment or hopping of OFDM subcarriers with respect to the different DAB services or programs. The shuffled symbol stream is input to an OFDM transmitter and RF transmitter front end 404 for transmission using various OFDM subcarrier frequencies.

In particular, after the bits are assembled and mapped into a contiguous symbol stream in the bits to symbol mapper 402, they are passed to the symbol reassignment encoder 150 which functions as an OFDM subcarrier hopping block. 'Contiguous' as used herein refers only to an ordering of data or data symbols, and not necessarily to the timing or other physical aspect of the data stream.

The symbol reassignment encoder 150 reshuffles the contiguous symbol stream received from the bits to symbols mapper 402 into a non-contiguously assigned symbol stream, effectively reassigning the available OFDM subcarriers 1 to N with respect to the symbols from the particular DAB services or programs which they are servicing. This shuffled or non-contiguously assigned symbol stream is then input to the OFDM transmitter and RF transmitter front end 404 for transmission using OFDM modulation.

FIG. 1B shows the receiving portion 130 of an OFDM transmission system in accordance with the principles of the present invention.

Figure 4:
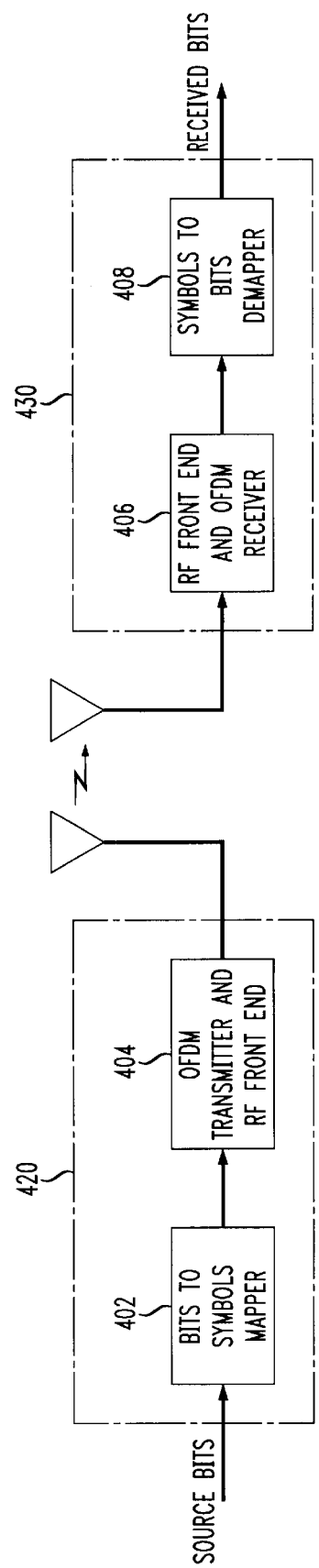
FIG. 4 shows a high level block diagram of a conventional OFDM transmission system.
Figure 5:
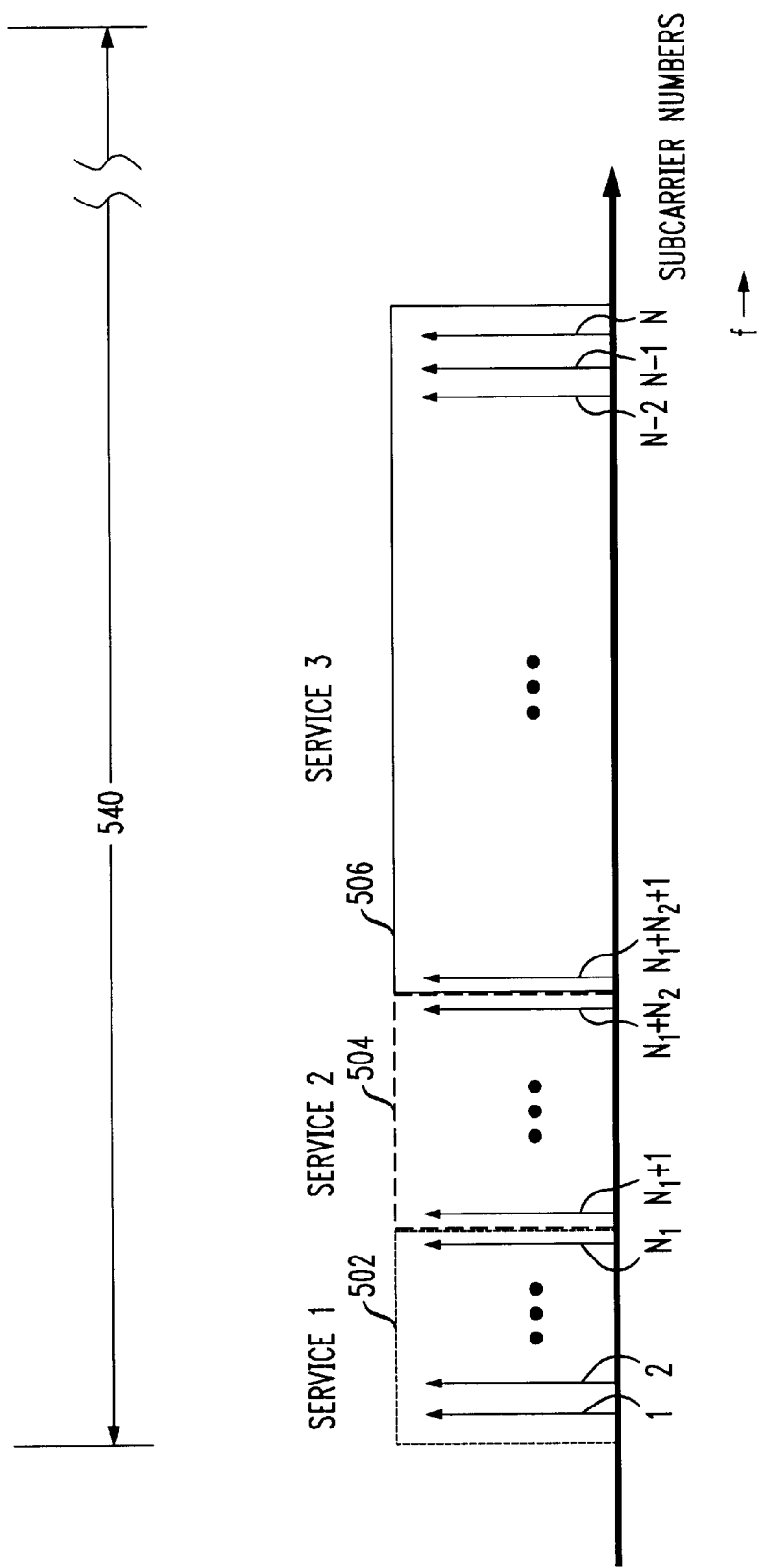
FIG. 5 shows a conventional arrangement of OFDM subcarriers for three different DAB services or programs.

In FIG. 1B, an RF receiver front end and OFDM receiver 406 receives the shuffled symbol stream containing information for the different DAB services or programs (e.g., three different DAB services or programs). Similar to the transmitting portion 120 shown in FIG. 1A and in accordance with the principles of the present invention, the receiving portion 130 shown in FIG. 1B includes a symbol reassignment decoder 160 placed between the RF receiver front end and an OFDM receiver 406 and the symbols to bits demapper 408. The symbol reassignment decoder 160 interprets and decodes the shuffled symbol stream to reverse the effect of the reassignment or hopping of the available OFDM subcarriers 1 to N carried out by the symbol reassignment encoder 150 of the transmitting portion 120. Thus, at the receiving end, shuffled symbols received from the available OFDM subcarriers 1 to N are un-shuffled back to their expected, contiguous assignment or ordering, e.g., as if transmitted contiguously via a conventional OFDM transmission system as shown in FIGS. 4 and 5.

Thus, the symbol reassignment encoder 150 and symbol reassignment decoder 160 function to reassign or hop available OFDM subcarriers with respect to contiguous symbols representing data from the different DAB services or programs.

According to the principles of the present invention, the available OFDM subcarriers 1 to N are effectively reassigned non-contiguously with respect to the particular DAB services or programs. For instance, the DAB services or programs may be assigned to the available OFDM subcarriers in a random or non-random manner, depending on desired performance criteria and the nature of the DAB service at hand. The effective reassignment of available OFDM subcarriers in accordance with the principles of the present invention may take place from one frame of data for the DAB services or programs to the next. Alternatively, the effective reassignment may be performed according to a pre-assigned table, e.g., after a plurality K of the symbols, or after a plurality L of data frames.

The choice of the particular effective reassignment technique chosen and the periodicity of the effective reassignment takes place is a specific design issue, and will depend on characteristics of the transmission channel and/or other parameters of the system. For instance, one parameter of the system considered in a determination of the reassignment periodicity is how far apart, in frequency, each of the available OFDM subcarriers are. The closer the OFDM services are in frequency, the more likely that all or a substantial number of the available OFDM subcarriers would be simultaneously affected by, e.g., channel fade, and thus the less overall effect the effective reassignment in accordance with the present invention will have. On the other hand, the farther apart the available OFDM services are in frequency, the greater the chance that while one OFDM service may be subjected to undesirable channel characteristics, e.g., channel fade, other available OFDM services will be unaffected and thus have un-utilized margin of error correction capability afforded by conventional interleaving and/or FEC techniques. Thus, while applicable to all OFDM systems, the benefits of the present invention may be best seen in OFDM systems having OFDM services which are relatively wider apart. In any event, it is preferred that the periodicity of the effective reassignment of the OFDM subcarriers be much less than the reciprocal of the Doppler frequency.

The effective reassignment or OFDM subcarrier hopping method and apparatus of the present invention is applicable to two or more DAB services or programs in general. The error mitigation provided by the present invention helps those of the DAB services or programs which participate in the inventive OFDM subcarrier reassignment or hopping method. Consequently, the DAB services or programs which do not hop their OFDM subcarriers in accordance with the present invention will not join in the benefits conferred by the sharing of channel anomalies provided by the OFDM subcarrier effective reassignment in accordance with the principles of the present invention. In the following examples, all DAB services or programs participate in the OFDM subcarrier hopping method in accordance with the principles of the present invention. However, it is to be understood by those of skill in the art that all DAB services or programs need not effectively reassign subcarriers to be within the scope of the present invention.

Figure 2:
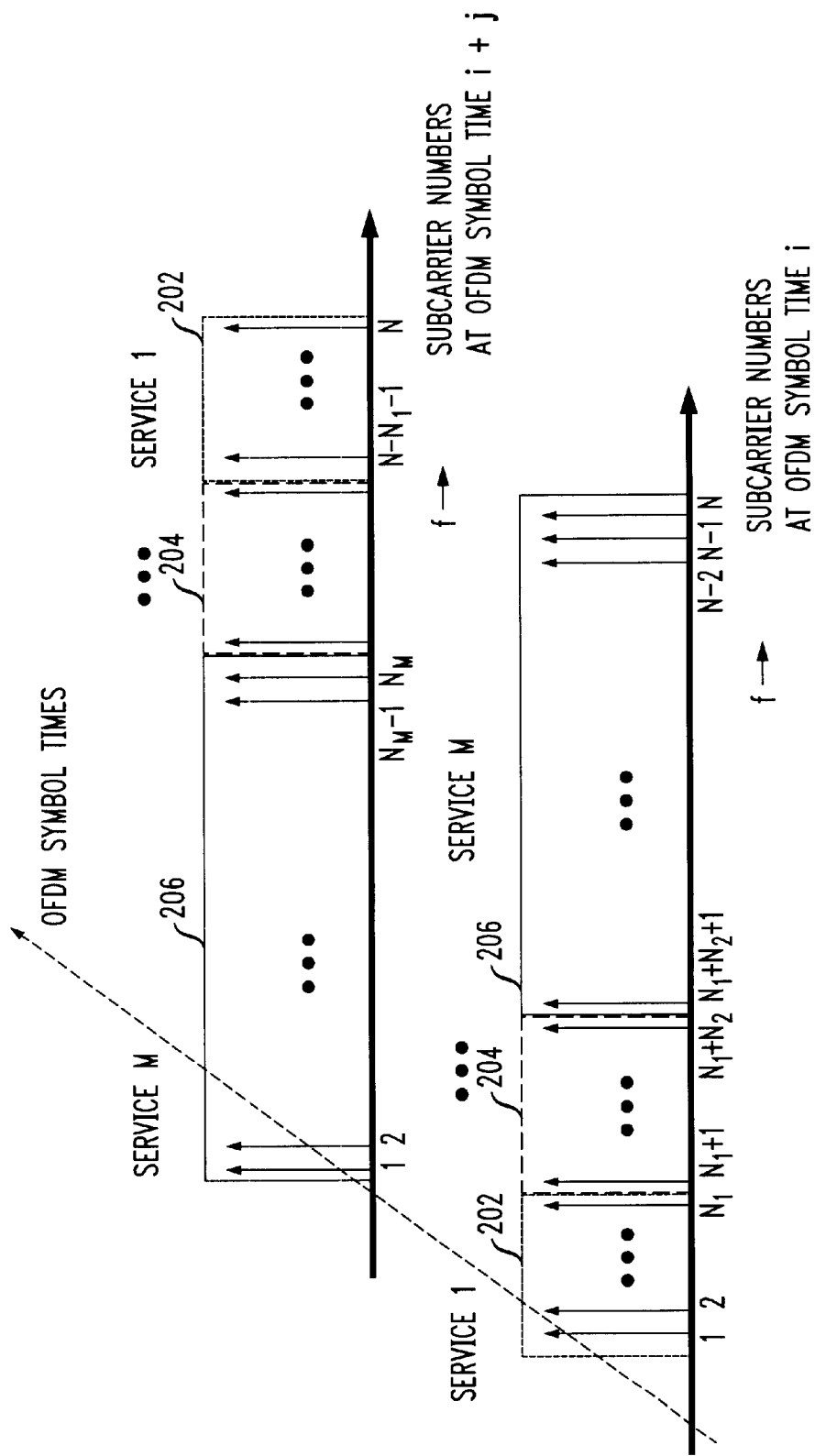
FIG. 2 shows the reassignment of OFDM subcarriers for a number of DAB services or programs in a transmission channel in accordance with a first embodiment of the symbol reassignment encoder and decoder shown in FIG. 1.
Figure 3:
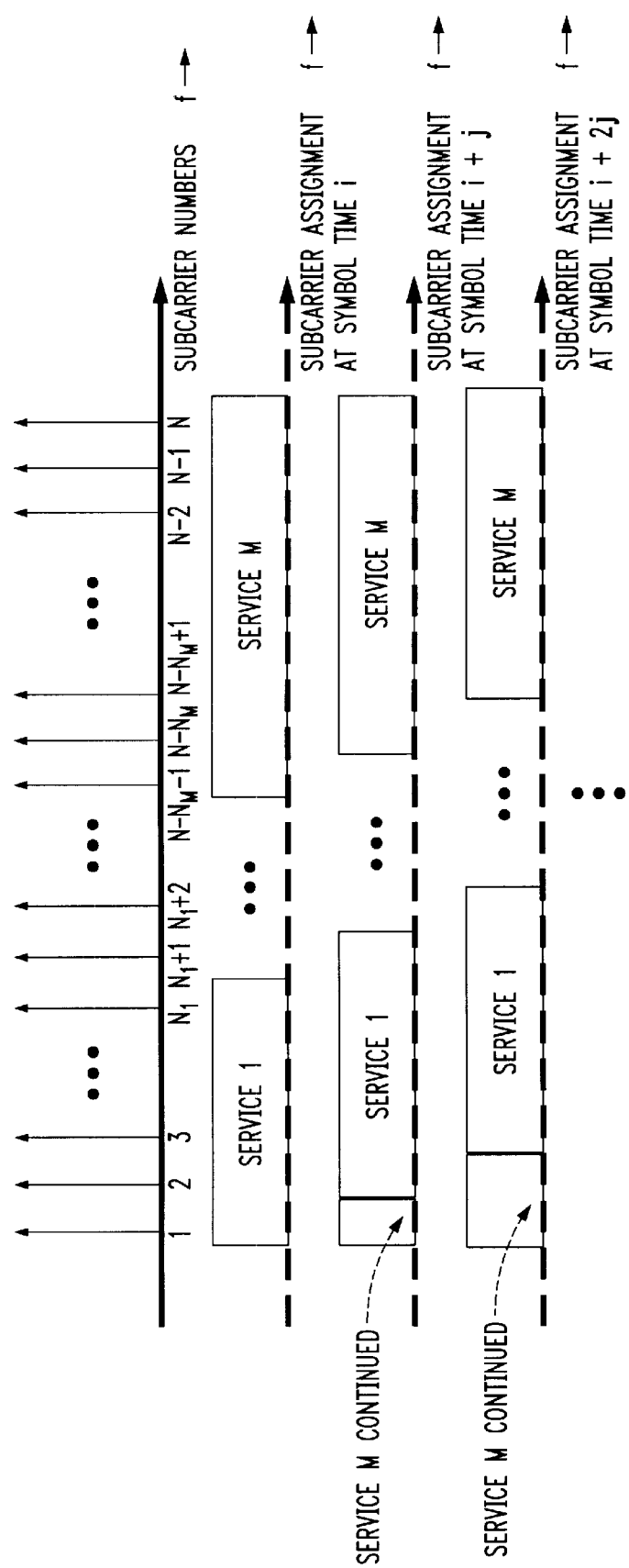
FIG. 3 shows the reassignment of OFDM subcarriers for a number of DAB services or programs in a transmission channel in accordance with a second embodiment of the symbol reassignment encoder and decoder shown in FIG. 1.

FIGS. 2 and 3 show in detail the operation of a first and second embodiment, respectively, of the symbol reassignment encoder 150 (FIG. 1A) and the symbol reassignment decoder 160 (FIG. 1B). FIGS. 2 and 3 show two of the possible non-random reassignment techniques. The choice of any one reassignment method over another is a design choice. In particular applications, one particular non-contiguous reassignment method in accordance with the principles of the present invention may, over time, show improved results over another non-contiguous reassignment method, depending on the particular OFDM system.

FIG. 2 shows a reassignment or hopping of OFDM subcarriers 1 to N wherein the effective assignment order of the OFDM subcarriers 1 to N is reversed, e.g., every K symbols, K being 1 or more. After K symbols are transmitted, a control signal is transmitted to the receiver to coordinate and synchronize the decoding or un-shuffling of the data symbols at the receiver end.

For instance, let there be a total of N OFDM subcarriers across the bandwidth of the transmission channel 540 utilized for DAB services or programs. Also let there be M DAB services trying to utilize this bandwidth, with DAB service 1 being effectively assigned $N_1$ OFDM subcarriers, DAB service 2 being effectively assigned $N_2$ OFDM subcarriers, etc. So, $N_1+N_2+ \ldots +N_M=N$.

Thus, as shown in the example of FIG. 2 with M=3, for the first K symbols or data frames starting at time i, if OFDM subcarrier 1 is assigned as the first OFDM subcarrier of a first DAB service 202, OFDM subcarrier 2 assigned as the second OFDM subcarrier of the first DAB service 202, etc. up to the effective assignment of OFDM subcarrier $N_1$ as the last OFDM subcarrier of the first DAB service 202, the effective assignment of OFDM subcarrier $N_1+1$ as the first OFDM subcarrier of the second DAB service 204, and so on up to the effective assignment of OFDM subcarrier N as the last OFDM subcarrier of the last DAB service 206. This is similar to the conventional assignment shown in FIG. 5.

However, inventively, for the second K symbols or data frames starting at time i+j, OFDM subcarrier 1 will be assigned as the first OFDM subcarrier of the last (e.g., third) DAB service 206, OFDM subcarrier 2 as the second OFDM subcarrier of the last DAB service 206, . . . , OFDM subcarrier $N_M$ as the last OFDM subcarrier of the last DAB service 206, OFDM subcarrier $N_M-1$ as the first OFDM subcarrier of the second DAB service M-1, and so on to the reassignment of OFDM subcarrier N as the last OFDM subcarrier of the first DAB service 202. This effective reassignment reversing the contiguous assignment of the available subcarriers 1 to N with respect to the different DAB services or programs M is shown in FIG. 2.

In general, the value of K can be maintained in a table, and changed from time to time as desired. For instance, a first reassignment may take place after $K_1$ OFDM symbols, a second reassignment after $K_2$ OFDM symbols, and so on. The benefits of the present invention may alternatively be realized with a fixed value for K.

FIG. 3 shows the operation of a second embodiment of the symbol reassignment encoder 150 and symbol reassignment decoder 160 shown in FIGS. 1A and 1B, respectively, wherein the available or desired OFDM subcarriers 1 to N are effectively reassigned in a circular fashion.

In particular, in FIG. 3, the available OFDM subcarriers 1 to N are shifted circularly among the different DAB services or programs by shuffling the symbols corresponding to the bit streams from the different DAB services or programs. Thus, e.g., assume that there are M different DAB services or programs, and that all M DAB services or programs are taking part in the OFDM subcarrier reassignment scheme.

The initial OFDM subcarrier effective reassignment scheme in an OFDM symbol according to this embodiment is as follows. Initially, e.g., at time i, OFDM subcarrier 1 is effectively assigned as the first OFDM subcarrier of DAB service 1, OFDM subcarrier 2 is effectively assigned as the second OFDM subcarrier of DAB service 1, . . . , OFDM subcarrier $N_1$ is effectively assigned as the last OFDM subcarrier of DAB service 1, OFDM subcarrier $N_1+1$ is effectively assigned as the first OFDM subcarrier of DAB service 2, and so on to OFDM subcarrier N, which is effectively assigned as the last OFDM subcarrier of the last DAB service M beginning in an OFDM symbol. This initial assignment of the available subcarriers 1 to N is similar to the conventional assignment shown in FIG. 5.

However, inventively, at a second time i+j (or at the $K^{th}$ OFDM symbol), the available OFDM subcarriers will be effectively reassigned as follows.

OFDM subcarrier 1 is reassigned as the $L^{th}$ OFDM subcarrier of DAB service 1, OFDM subcarrier 2 is reassigned as the $L+1^{st}$ OFDM subcarrier of DAB service 1, ..., OFDM subcarrier $N_1-L+1$ as the last OFDM subcarrier of DAB service 1, OFDM subcarrier $N_1-L+2$ as the first OFDM subcarrier of DAB service 2, OFDM subcarrier $N_1+N_2-L+1$ as the last OFDM subcarrier of DAB service 2, and so on to OFDM subcarrier N as the $L-1^{st}$ OFDM subcarrier of the first DAB service.

If L=1, then no effective reassignment takes place, and all OFDM symbols will have the same assignment pattern. However, as shown in FIG. 3, if L=2 the available OFDM carriers 1 to N will be circularly shifted every K OFDM symbols with respect to the contiguous symbol stream from the DAB services or programs. Thus, with L=2, the effective reassignment pattern shifts to the right by one OFDM subcarrier every K OFDM symbols. With L=3, the effective reassignment pattern shifts to the right by two OFDM subcarriers every K OFDM symbols. Of course, shifts to the left are equally possible within the principles of the present invention.

Benefits of the present invention are shown for the example of an FM all digital IBOC transmission system. The present invention helps to mitigate the problems of slowly changing selective fades which can occur quite frequently. In the presence of a slowly varying selective fade, a number of OFDM subcarriers will be affected and the data modulated on the OFDM subcarriers may be unrecoverable, thus loosing their data altogether. However, in accordance with the present invention, with effective reassignment of available OFDM subcarriers, the fade suffering DAB service may not have the faded OFDM subcarriers assigned to it in the next round. This together with the conventional interleaver and/or FEC protocols of the particular DAB service can result in error rates that are acceptable for that DAB service, even in a fading channel environment.

It is possible that this error mitigation may in certain circumstances be achieved at the expense of another DAB service whose OFDM subcarriers were not affected by channel fades, and due to the effective reassignment in accordance with the present invention. However, as long as the channel fades do not cause error rates beyond an acceptable limit for that DAB service after interleaving and FEC for that DAB service, then all DAB services or programs can come out with acceptable results, even in a fading channel environment.

The first embodiment of the present invention achieves effective reassignment of available subcarriers with respect to the DAB services or programs by reversing the OFDM subcarrier assignment every so many OFDM symbols, whereas the second embodiment achieves effective reassignment by circularly shifting the location of the DAB services on the frequency spectrum. In either case, faded OFDM subcarriers are effectively reassigned to different DAB services every so many OFDM symbols. Of course, other reassignment patterns are possible within the principles of the present invention.

The principles of the present invention relate to transmission channels in general, and not just to the specific embodiments disclosed, e.g., with respect to an In-Band On-Channel (IBOC) FM Digital Audio Broadcast (IBOC FM-DAB) system.

Although preferably all available DAB services or programs are reassigned OFDM subcarriers in accordance with the present invention, not all DAB services or programs need implement reshuffling. For instance, the symbol reassignment encoder 150 and decoder 160 may skip over or leaving effectively unshuffled bits from one or more particular DAB services or programs.

The principles of the present invention spread the burden of deteriorating affects on a channel, e.g., selective channel fade, from any one or less than all DAB services or programs, substantially equally to all DAB services or programs. Thus, instead of having one DAB service or program which occasionally or selectably suffers badly from, e.g., channel fade, while another DAB service or program in the same channel, e.g., FM channel, operating reliably and above the error correction capability of its interleaving and/or FEC, all DAB services or programs in a channel are affected equally.

By affecting all DAB services or programs substantially equally, the overall system becomes more robust and reliable. For instance, the full capability of all the respective interleaving and FEC functions will be utilized to their fullest potential before any particular DAB service or program will suffer. Thus, all DAB services or programs will suffer from a channel fade in an orderly manner.

If there is a large disparity between the channel quality with respect to two or more of the different DAB services and programs, and often enough this will be the case in some geographical situations, then overall reliability of the DAB services or programs will be increased, at least up to the error correction capability of the interleaver and FEC methods of each DAB service.

The present invention applies to DAB services or programs which may have different or additional error correction or channel fade avoidance techniques implemented. For instance, any one or all of the different DAB services or programs may have interleaving, FEC, and/or other techniques of channel fade avoidance or error correction capability.

Moreover, the present invention is independent of the interleaver, FEC and/or other error correction methods implemented in the various DAB services or programs. For instance, because the principles of the present invention operate on a bit stream, each of the different DAB services or programs may or may not have similar interleaver and FEC methods.

The present invention applies equally to wireless systems as it does to wired systems, e.g., ADSL (Asynchronous Digital Subscriber Loop) systems.

The increased reliability of the DAB services or programs may also provide an increase in coverage area, e.g., in miles for the broadcast of the DAB services or programs.

While the invention has been described with reference to the exemplary embodiments thereof, those skilled in the art will be able to make various modifications to the described embodiments of the invention without departing from the true spirit and scope of the invention.

What is claimed is:

1. A transmitter for an orthogonal frequency division multiplexing transmission system, said transmitter comprising:

a data reassignment encoder adapted to shuffle an input data stream corresponding to a plurality of services into a shuffled output data stream, said shuffled data in said output data stream being shuffled with respect to an arrangement of corresponding data in said input data stream; and an orthogonal frequency division multiplexing transmitter adapted to transmit said output data stream at a plurality of subcarriers;

said shuffling effectively reassigning each of said plurality of services to different subcarriers over time.

2. The transmitter for an orthogonal frequency division multiplexing transmission system according to claim 1, wherein:

said data reassignment encoder sequentially rotates an assignment of available subcarriers to each of said plurality of services.

3. The transmitter for an orthogonal frequency division multiplexing transmission system according to claim 1, wherein:

said data reassignment encoder periodically reverses an assignment of available subcarriers to each of said plurality of services.

4. The transmitter for an orthogonal frequency division multiplexing transmission system according to claim 1, wherein:

said data stream is a stream of shuffled data symbols.

5. The transmitter for an orthogonal frequency division multiplexing transmission system according to claim 1, wherein:

said plurality of services are In-Band On-Channel FM digital audio broadcast services.

6. The transmitter for an orthogonal frequency division multiplexing transmission system according to claim 1, wherein:

said plurality of services are digital wireless services.

7. A receiver for an orthogonal frequency division multiplexing transmission system, said receiver comprising:

a receiver, in said orthogonal frequency division multiplexing transmission system, adapted to receive a shuffled data stream corresponding to a plurality of services; and a data reassignment decoder adapted to un-shuffle said shuffled data stream to re-align said data stream with respect to said plurality of services.

8. The receiver for an orthogonal frequency division multiplexing transmission system according to claim 7, wherein:

said data reassignment decoder is adapted to effectively reassign each of said subcarrier frequencies based on a control signal received with said shuffled data stream.

9. The receiver for an orthogonal frequency division multiplexing transmission system according to claim 7, wherein:

said data reassignment decoder sequentially rotates an assignment of available subcarriers to each of said plurality of services.

10. The receiver for an orthogonal frequency division multiplexing transmission system according to claim 7, wherein:

said data reassignment decoder periodically reverses an assignment of available subcarriers to each of said plurality of services.

11. The receiver for an orthogonal frequency division multiplexing transmission system according to claim 7, wherein:

said shuffled data stream is a stream of shuffled data symbols.

12. The receiver for an orthogonal frequency division multiplexing transmission system according to claim 7, wherein:

said plurality of services are digital wireless services.

13. A method of transmitting a data stream corresponding to a plurality of services using orthogonal frequency division multiplexing, said method comprising:

shuffling an input data stream corresponding to said plurality of services into an output data stream containing shuffled data which is non-contiguous with respect to corresponding data in said input data stream; and transmitting said shuffled data stream over a plurality of subcarriers using orthogonal frequency division multiplexing;

said shuffling of said input data stream effectively reassigning each of said subcarriers with respect to said plurality of services.

14. The method of transmitting a data stream corresponding to a plurality of services using orthogonal frequency division multiplexing according to claim 13, wherein:

said shuffling sequentially rotates an effective assignment of available subcarriers to each of said plurality of services.

15. The method of transmitting a data stream corresponding to a plurality of services using orthogonal frequency division multiplexing according to claim 13, wherein:

said shuffling periodically reverses an effective assignment of available subcarriers to each of said plurality of services.

16. A method of receiving a shuffled data stream corresponding to a plurality of services using orthogonal frequency division multiplexing, said method comprising:

receiving, from said plurality of services using orthogonal frequency division multiplexing, a shuffled input data stream transmitted over a plurality of subcarriers using orthogonal frequency division multiplexing; and un-shuffling said input data stream and providing an un-shuffled output data stream to re-align said data stream with respect to said plurality of services, said un-shuffling being based on a control signal received with said shuffled input data stream.

17. The method of receiving a shuffled data stream corresponding to a plurality of services using orthogonal frequency division multiplexing according to claim 16, wherein:

said un-shuffling sequentially rotates an effective assignment of available subcarriers to each of said plurality of services.

18. The method of receiving a shuffled data stream corresponding to a plurality of services using orthogonal frequency division multiplexing according to claim 16, wherein:

said un-shuffling periodically reverses an effective assignment of available subcarriers to each of said plurality of services.

19. Apparatus for transmitting a data stream corresponding to a plurality of services using orthogonal frequency division multiplexing, comprising:

means for shuffling an input data stream corresponding to said plurality of services into an output data stream containing shuffled data with respect to corresponding data in said input data stream, said means for shuffling effectively reassigning each of said subcarriers with respect to said plurality of services; and means for transmitting said shuffled data stream over a plurality of subcarriers using orthogonal frequency division multiplexing.

20. The apparatus for transmitting a data stream corresponding to a plurality of services using orthogonal frequency division multiplexing according to claim 19, wherein:

said means for shuffling sequentially rotates an effective assignment of available subcarriers to each of said plurality of services.

21. The apparatus for transmitting a data stream corresponding to a plurality of services using orthogonal frequency division multiplexing according to claim 19, wherein:

said means for shuffling periodically reverses an effective assignment of available subcarriers to each of said plurality of services.

22. Apparatus for receiving a shuffled data stream corresponding to a plurality of services using orthogonal frequency division multiplexing, comprising:

means for receiving, from said plurality of services using orthogonal frequency division multiplexing, a shuffled input data stream transmitted over a plurality of subcarriers using orthogonal frequency division multiplexing; and means for un-shuffling said input data stream and providing an un-shuffled output data stream to re-align said data stream with respect to said plurality of services, said un-shuffling being based on a control signal received with said shuffled input data stream.

23. The apparatus for receiving a shuffled data stream corresponding to a plurality of services using orthogonal frequency division multiplexing according to claim 22, wherein:

said means for un-shuffling sequentially rotates an effective assignment of available subcarriers to each of said plurality of services.

24. The apparatus for receiving a shuffled data stream corresponding to a plurality of services using orthogonal frequency division multiplexing according to claim 22, wherein:

said means for un-shuffling periodically reverses an effective assignment of available subcarriers to each of said plurality of services.

* * * * *